United States Patent [19]
Grüger et al.

[11] Patent Number: 6,078,692
[45] Date of Patent: Jun. 20, 2000

[54] METHOD FOR CODING VIDEO DATA

[75] Inventors: Klaus Grüger; Martin Köhler, both of Hannover, Germany

[73] Assignee: SICAN GmbH, Hannover, Germany

[21] Appl. No.: 09/009,905

[22] Filed: Jan. 21, 1998

[30] Foreign Application Priority Data

Jan. 21, 1997 [DE] Germany ............... 197 01 942

[51] Int. Cl.[7] ............................................. G06K 9/46
[52] U.S. Cl. .................... 382/236; 382/238; 348/402; 348/416
[58] Field of Search ......................... 382/232, 236, 382/239, 240, 248, 250, 238; 348/402, 409, 407, 416, 419; 358/261.2, 430

[56] References Cited

U.S. PATENT DOCUMENTS

| | | | |
|---|---|---|---|
| 5,329,365 | 7/1994 | Uz | 348/469 |
| 5,774,593 | 6/1998 | Zick et al. | 382/236 |
| 5,872,604 | 2/1999 | Ogura | 348/699 |

OTHER PUBLICATIONS

Teichner, D., "Der MPEG–2–Standard" in *Fernseh– und Kinotechnik*, No. 5, 1994, pp. 227–237.

De Lameillieure, J. and R. Schäfer, "MPEG–2–Bildcodierung für digitale Fernsehen" in *Fernseh– und Kinotechnik*, No. 3, 1994, pp. 99–107.

"Komprimierte Bewegung" of J. Buck, mc, Apr. 1994, pp. 114 to 123.

*Primary Examiner*—Bhavesh Mehta
*Attorney, Agent, or Firm*—Flehr Hohbach Test Albritton & Herbert LLP; Richard E. Backus

[57] ABSTRACT

The invention provides a method for coding video data which includes at least one intracoded picture (I-Picture), at least one predicted picture (P-Picture) and at least one bidirectional predicted picture (B-Picture).

3 Claims, 1 Drawing Sheet

METHOD FOR CODING VIDEO DATA

BACKGROUND OF THE INVENTION

1. Field of the Invention

The invention relates to a method for coding video data comprising at least one intracoded picture (I-Picture), at least one predicted picture (P-Picture) and at least one bidirectional predicted picture (B-Picture), wherein in a first step a P-Picture is predicted from a I- or P-Picture respectively, which is preceding said B-Picture in the order of display of said pictures, and wherein a B-Picture is predicted from said P-Picture of the first step.

2. Description of the Related Art

Compression methods are used for storing and transmitting high quantity of data obtained e.g. with video and audio data. For video processing, the JPEG-Standard is defined to compress a single picture and the MPEG-Standard is defined to compress motion pictures. The Motion-Picture-Expert-Group had defined two MPEG-Standards until now, MPEG-1 and MPEG-2. The compression methods are basing on the following methods: Motion compensation, Discrete Cosine Transformation (DCT), Quantization and Huffman-Coding. A summary of said standards can be found e.g. in: "Der MPEG-2-Standard" from D. Teichner in "Fernseh- und Kinotechnik", $48^{th}$ year, No. 5, 1994, pages 227 to 237. The standard itself is described in "Coding of moving picture and associated audio for digital storage media", ISO/IEC DIS 11172, Beuth-Verlag, Berlin.

Successive pictures are very similar in moving sequences of pictures, and that similarity is used in the MPEG-Method. Picture elements will be continuously extending from one picture to the other, except for abrupt changes of scenes. Then, the motion of the picture elements can be transmitted by shift vectors without transmitting the picture data itself. In practice, blocks of pixel, so called macroblocks, of a size of 16×16 pixels are used for the motion compensation. Afterwards, the difference of the real macroblock and the shifted macroblock is calculated and the difference is coded and transmitted together with the shift vector. The smaller the difference between the shifted and the real macroblocks is, the more effective the method.

In "Komprimierte Bewegung" of J. Buck, mc, April 1994, pages 114 to 123, the common coding method is set forth. That article describes the three types of pictures used in the MPEG-Standard, namely I-Picture (intra), P-Picture (predicted) and B-Picture (bidirectional predicted). An intracoded picture represents the information of one digital picture. Motion compensation is not processed. The I-pictures are the pictures of origin for processing P- and B-pictures. The P-pictures are derived from pictures of I- or P-type which are preceding in time using a motion estimation. The P-pictures are used as reference pictures for processing shift vectors as well. The B-pictures are deduced from preceding as well as succeeding I- and P-pictures respectively. That is why the B-pictures can be compressed to a greater extent with a constant picture quality. They cannot be used for processing shift vectors and therefore, in contrast to P-pictures, the B-pictures do not contribute to error reproduction. The missing error reproduction allows coding the B-pictures using a lower number of bits, compared to coding the P-pictures, for regulating the bit stream.

The processing of B- and P-pictures is well known in the state of the art. For processing the B-pictures common methods for prediction are used. The pictures are displayed e.g. in the order:
$I_0$-$B_1$-$B_2$-$P_3$-$B_4$-$B_5$-$P_6$.

Therefore, the following order of transmission of the pictures is required:
$I_0$-$P_3$-$B_1$-$B_2$-$P_6$-$B_4$-$B_5$.

Thus, at first a P-picture ($P_3$) is derived by motion estimation from the first I-picture ($I_0$). Next, the first and second B-picture ($B_1$+$B_2$) is derived from the I-picture ($I_0$) and the first P-picture ($P_3$). And from the first and second P-picture ($P_3$+$P_6$) the third and fourth B-picture ($B_4$+$B_5$) is processed.

The main features of picture coding using the MPEG-2 -standard are described in "Fernseh- und Kino-Technik", No. 3, 1994, pages 99 to 107, and No. 5, 1994, pages 227 to 237 as well. It is pointed out that video data, which are arriving at the decoder input in the order I-B-P-B-P, are resorted in the order I-P-B-P-B for bidirectional prediction. Afterwards the bidirectional prediction of the B-pictures is processed in one step each from the preceding picture (I or P) and the succeeding reference picture (P).

In U.S. Pat. No. 5,329,365 processing of further B-pictures in addition to said common I-, P- and P-pictures is proposed for improving the picture quality using a bidirectional prediction from an I- or P-picture and a B-picture. However, increased memory would then be required.

Processing of the motion compensation is very costly, so that efficient circuits are required for realtime coding. Nevertheless, the length of the shift vectors used for the motion estimation in the encoding process has to be limited to a relatively small search area for limiting the calculation and memory bandwith expenditure . It is thus impossible to register fast and large movements of scenes in pictures. Candidate vectors are used for extending the search area having a justifiable calculation expenditure, which shift the search area using an offset in relation to the position of a specimen macroblock. The quality of the compression decisively depends on the quality of the method for determining the candidate vectors.

For determining candidate vectors, recursive methods are well known from the literature wherein motion information which is determined for time preceding pictures is used for finding the candidate vectors. Prior to the present invention, such a recursive method would be applied in conventional methods, e.g. a P-picture receives candidate vectors from a preceding P-picture in a recursive manner.

OBJECTS AND SUMMARY OF THE INVENTION

It is a general object of the invention to provide a method for coding video data into intracoded pictures (I-pictures), predicted pictures (P-pictures) and bidirectional predicted pictures(B-pictures), in which the search area for determining of the shift vectors between pictures is limited to the extent possible.

In summary, the method of the invention provides for coding video data, in which the video data comprises at least one intracoded picture (I-picture), at least one predicted picture (P-picture) and at least one bidirectional predicted picture (B-picture). The method includes the steps of:

a) predicting a second reference picture (P-picture) from a first reference picture (I- or P-picture), in which the first reference picture is senior in the order of display of the pictures, b) predicting a B-picture from the first and second reference picture, in which the B-picture is predicted in two steps, c) in the first step the B-picture from the first reference picture is predicted earlier than the second reference picture, d) in the second step the B-picture from the second reference picture is predicted after the second reference picture, and e) the motion information of the B-picture predicted in step c) is used for defining the search vectors or search areas for processing of motion estimation for predicting the second reference picture.

The invention is based on the recognition that shift vectors determined in B-pictures can be advantageously used for processing shift vectors for a P-picture which succeeds the B-pictures in the display order. Therefore, processing at least one B-picture from a preceding I- or P-picture is necessary. Next, the shift vectors of said at least one B-picture are used for limiting the search area for the P-picture which follows in the display order. Thus the candidate vectors are determined by a recursion in time. This results in a higher quality because the method falls back upon the vectors of the direct preceding B-pictures. Thus the conventional method is based on the vectors of P-pictures which are displayed with about 20 milliseconds lag time. After determining the P-picture, it is possible to process B-pictures from the P-picture and from the preceding I- or P-pictures using conventional methods for bidirectional prediction. That procedure has the disadvantage of requiring determination of a B-picture using a simple prediction first and then processing an additional simple or bidirectional prediction. Therefore the data of the B-picture has to be read twice.

The inventors have found that the disadvantage described above is compensated for by the method's advantages. With the present invention it is possible to limit the search area without further measures by use of shift vectors only so that resources needed for the calculation are reasonable.

The invention provides a method which gives priority to a part of processing of each B-picture. Therefore the B-picture processing can be finished earlier as compared to conventional procedures. This advantage can be profitably used for lowering the memory requirements and expense or the run time of a picture.

One embodiment of the invention obviates the need to use interpolation of I- or P-pictures for the estimation of the B-pictures. Thus, the following I- or P-picture is able to overwrite its predecessor in the memory. Therefore the memory expense can be further reduced.

DESCRIPTION OF THE PREFERRED EMBODIMENTS

The invention provides a change in the order of processing the B-pictures at the encoding process as compared to conventional picture processing methods. The order of the pictures in the data stream remains unchanged.

The coding procedure is divided into two parts of the process for motion estimation, namely 1) forward prediction of the B-picture; and
2) backward prediction and interpolation of the B-picture.

Figure 2:
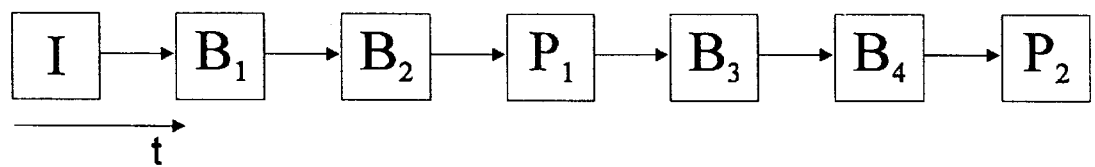
FIG. 2 is a flow chart showing the order and the access for the coding of MPEG-pictures in the method of the invention.

FIG. 2 shows the order of the coding procedure of MPEG pictures according to one preferred embodiment of the invention. Using conventional and known estimation procedures, a first B-picture ($B_1$) and a second B-picture ($B_2$) are processed from the I-picture (I). Then, a P-picture (P) is predicted from the I-picture (I) while the motion information of the B-pictures ($B_1$, $B_2$) is used for determining search vectors and for limiting the search areas. That is, the shift vectors of a preceding B-pictures are candidate vectors. Next, a backward prediction of the B-pictures ($B_1$, $B_2$) is processed using the P-picture (P) and, if necessary, an interpolation of the I-picture (I) is processed. Simultaneous, a prediction of the new B-pictures ($B_3$, $B_4$) is processed using the P-picture (P). The B-picture information can be stored at memory areas of the preceding B-pictures ($B_1$ or $B_2$) which are already displayed or transmitted.

Figure 3:
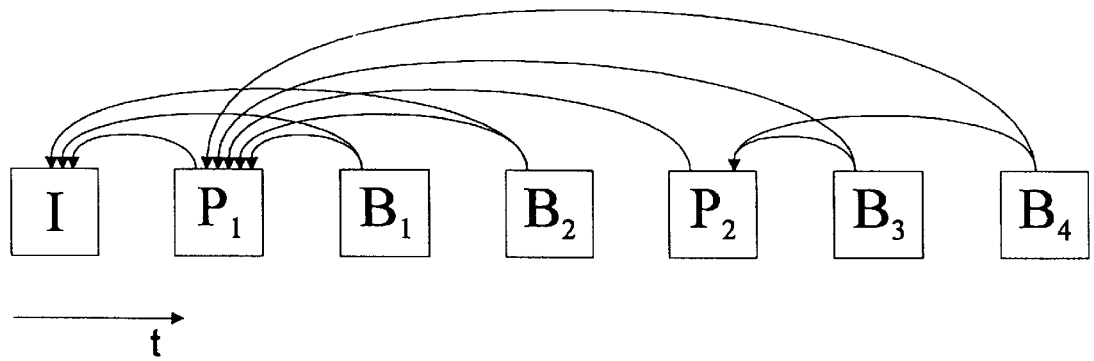
FIG. 3 is a flow chart of the display order of MPEG-pictures.

The display order of the different types of pictures as defined in the MPEG-standard is shown in the FIG. 3. As shown therein the B-pictures are displayed before the relating P-picture ($B_1$, $B_2$, $P_1$ or $B_3$, $B_3$, $P_2$), In the FIG. 1, the conventional coding method is shown. As opposed to the method of the invention, the conventional method does not provide processing of B-pictures by prediction of a preceding I- or P-picture only. Instead, the P-picture is first processed from the preceding I- or P-picture. Then, the B-pictures are predicted bidirectionally from the I- and P-pictures using only one step.

Figure 1:
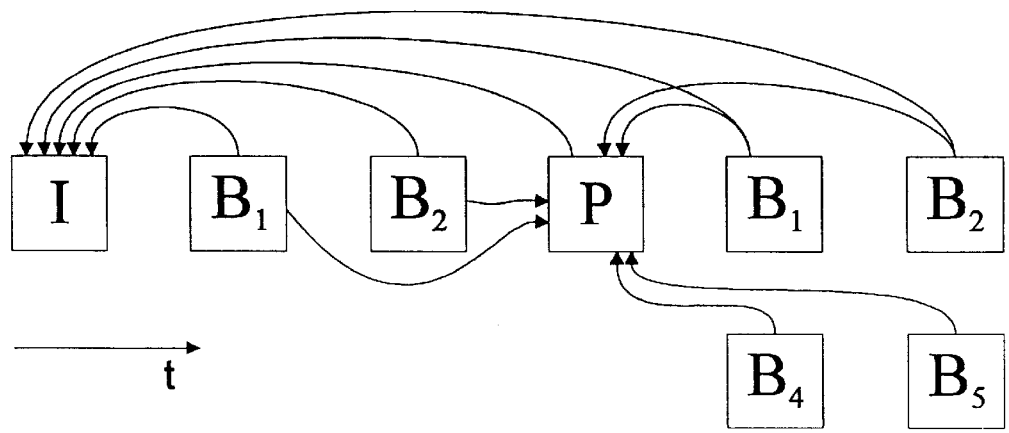
FIG. 1 is a flow chart showing the conventional order and the access for the coding of MPEG-pictures.

As an example, the processing orders of the conventional method of FIG. 1 and the method of the invention are compared. The calculation of the forward prediction of the B-pictures corresponds to the display order, as can be seen in Table 1. In the table F means forward prediction and B+I means backward prediction and interpolation. However, the backward prediction and the interpolation of the B-pictures are delayed.

TABLE 1

Comparison of the processing order of conventional methods with the method of the invention

| Time t | 0 | 1 | 2 | 3 | 4 | 5 | 6 | 7 | 8 |
|---|---|---|---|---|---|---|---|---|---|
| Display | $I_0$ | $B_1$ | $B_2$ | $P_3$ | $B_4$ | $B_5$ | $P_6$ | $B_7$ | $B_8$ |
| Common Methods | | | $I_0$ | $P_3$ | $B_1$ F $B_1$ B + I | $B_2$ F $B_2$ B + I | $P_6$ | $B_4$ F $B_4$ B + I | $B_5$ F $B_5$ B + I |
| Method of Invention | $I_0$ | $B_1$ F | $B_2$ F | $P_3$ | $B_1$ B + I $B_4$ F | $B_2$ B + I $B_5$ F | $P_6$ | $B_4$ B + I $B_7$ F | $B_5$ B + I $B_8$ F |

As can be seen in the table 1, dividing the prediction of said B-pictures into a forward- and a backward prediction process does not involve additional processing time because the processing of the P-picture first can be started at time t=3.

What is claimed is:

1. A method for coding video data which comprises at least one intracoded picture (I-picture), at least one predicted picture (P-picture) and at least one bidirectional predicted picture (B-picture), the method comprising the steps of:
   a) predicting a second reference picture (P-picture) from a first reference picture (I- or P-picture), in which the first reference picture is senior in the order of display of the pictures,
   b) predicting a B-picture from the first and second reference pictures, in which the B-picture is predicted by the steps of
   c) first predicting the B-picture from the first reference picture earlier than predicting of said second reference picture, and
   d) second predicting the B-picture from the second reference picture after predicting of said second reference picture, and
   e) using the motion information of the B-picture predicted in step c) for defining the search vectors or search areas for processing motion estimation for predicting of the second reference picture.

2. The method of claim 1, comprising the step of predicting the B-picture of step (b) from said P-picture of step (a) and processing an interpolation using said I- or P-picture of step (a).

3. The method of claim 1, comprising the step of bidirectional predicting said B-picture of step (b) from said P-picture of step (a) or from said I- or P-picture used in step (a) without processing of an interpolation.

* * * * *